(12) United States Patent
Meo et al.

(10) Patent No.: US 11,558,292 B2
(45) Date of Patent: *Jan. 17, 2023

(54) AUTOMATIC CONFIGURATION AND CONNECTION OF HETEROGENEOUS BANDWIDTH MANAGED MULTICAST FABRICS

(71) Applicant: Cisco Technology, Inc., San Jose, CA (US)

(72) Inventors: Francesco Meo, San Jose, CA (US); Stig Ingvar Venaas, Oakland, CA (US); Roshan Lal, San Jose, CA (US); Rishi Chhibber, Dublin, CA (US); Ravinder Vissapragada, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/347,345

(22) Filed: Jun. 14, 2021

(65) Prior Publication Data

US 2021/0314259 A1 Oct. 7, 2021

Related U.S. Application Data

(63) Continuation of application No. 16/743,752, filed on Jan. 15, 2020, now Pat. No. 11,082,336.

(51) Int. Cl.
*H04L 45/52* (2022.01)
*H04L 45/02* (2022.01)
(Continued)

(52) U.S. Cl.
CPC ............ *H04L 45/52* (2013.01); *H04L 12/185* (2013.01); *H04L 45/02* (2013.01); *H04L 45/04* (2013.01); *H04L 2101/622* (2022.05)

(58) Field of Classification Search
CPC ....... H04L 45/52; H04L 12/185; H04L 45/02; H04L 45/30; H04L 45/04; H04L 45/56
See application file for complete search history.

(56) References Cited

U.S. PATENT DOCUMENTS 6,134,599 A 10/2000 Chiu et al.
9,729,424 B2 8/2017 Yin et al.
(Continued)

FOREIGN PATENT DOCUMENTS

WO WO2017144945 A1 8/2017
WO WO2018006671 A1 1/2018

OTHER PUBLICATIONS

The PCT Search Report and Written Opinion dated Apr. 19, 2021 for PCT Application No. PCT/US2021/013087, 16 pages.

*Primary Examiner* — Mohamed A Kamara
(74) *Attorney, Agent, or Firm* — Lee & Hayes, P.C.

(57) ABSTRACT

Techniques for utilizing Software-Defined Networking (SDN) controllers and network border leaf nodes of respective cloud computing networks to configure a data transmission route for a multicast group. Each border leaf node may maintain a respective external sources database, including a number of records indicating associations between a multicast data source, one or more respective border leaf nodes disposed in the same network as the multicast data source, and network capability information. A border leaf node, disposed in the same network as a multicast data source, may broadcast a local source discovery message to all border leaf nodes in remote networks to which it is communicatively coupled. A border leaf node may also communicate network capability information associated with one or more remote networks to a local SDN controller. The SDN controller may utilize the network capability information to configure a data transmission route to one or more destination nodes.

20 Claims, 7 Drawing Sheets

(51) Int. Cl.
*H04L 12/18* (2006.01)
*H04L 101/622* (2022.01)

(56) References Cited

U.S. PATENT DOCUMENTS

| | | |
|---|---|---|
| 9,847,933 B2 | 12/2017 | Decusatis et al. |
| 10,003,539 B1 | 6/2018 | Pani et al. |
| 10,097,372 B2 | 10/2018 | Bhattacharya et al. |
| 10,432,427 B2 | 10/2019 | Chen |
| 2002/0051449 A1* | 5/2002 | Iwata .................. H04L 45/04 370/386 |
| 2003/0135644 A1* | 7/2003 | Barrett ................ H04Q 3/0062 709/238 |
| 2013/0322443 A1 | 12/2013 | Dunbar et al. |
| 2015/0222446 A1 | 8/2015 | Suresh et al. |
| 2016/0366051 A1 | 12/2016 | Chen et al. |
| 2019/0109730 A1 | 4/2019 | Uttaro et al. |
| 2019/0245775 A1 | 8/2019 | Chen et al. |

\* cited by examiner

300

302 RECEIVE, AT A SOFTWARE-DEFINED-NETWORKING (SDN) CONTROLLER IN A FIRST NETWORK, A REQUEST FROM A SOURCE NODE TO COORDINATE A DATA TRANSMISSION TO A MULTICAST GROUP OF DESTINATION NODES, WHEREIN THE SOURCE NODE IS DISPOSED IN THE FIRST NETWORK

304 DETERMINE, AT THE SDN CONTROLLER, THAT AT LEAST ONE DESTINATION NODE IN THE MULTICAST GROUP OF DESTINATION NODES IS IN A SECOND NETWORK THAT IS SEPARATE FROM THE FIRST NETWORK

306 IDENTIFY, AT THE SDN CONTROLLER, A FIRST BORDER NODE IN THE FIRST NETWORK COMMUNICATIVELY COUPLED TO A SECOND BORDER NODE IN THE SECOND NETWORK

308 SEND, FROM THE SDN CONTROLLER AND TO THE FIRST BORDER NODE, AN ADVERTISEMENT MESSAGE INCLUDING AN INDICATION OF AN ADDRESS OF THE SOURCE NODE, A GROUP ADDRESS ASSOCIATED WITH THE MULTICAST GROUP OF DESTINATION NODES, AND NETWORK CAPABILITY INFORMATION ASSOCIATED WITH THE FIRST NETWORK

310 CAUSE, BY THE SDN CONTROLLER, THE FIRST BORDER NODE TO SEND THE ADVERTISEMENT MESSAGE TO THE SECOND BORDER NODE

502 RECEIVE, AT A FIRST BORDER NODE DISPOSED IN A FIRST NETWORK AND FROM A SECOND BORDER NODE DISPOSED IN A SECOND NETWORK, AN ADVERTISEMENT MESSAGE INCLUDING AN INDICATION OF AN ADDRESS OF A SOURCE NODE HOSTING A DATA TRANSMISSION TO A MULTICAST GROUP OF DESTINATION NODES, A GROUP ADDRESS ASSOCIATED WITH THE MULTICAST GROUP OF DESTINATION NODES, AND NETWORK CAPABILITY INFORMATION ASSOCIATED WITH THE SECOND NETWORK, WHEREIN THE SOURCE NODE IS DISPOSED IN THE SECOND NETWORK

504 STORE, IN A DATABASE ASSOCIATED WITH THE FIRST BORDER NODE, THE ADDRESS OF THE SOURCE NODE, THE GROUP ADDRESS, AND THE NETWORK CAPABILITY INFORMATION IN ASSOCIATION WITH THE SECOND BORDER NODE

506 RECEIVE, AT THE FIRST BORDER NODE AND FROM A SOFTWARE-DEFINED-NETWORKING (SDN) CONTROLLER DISPOSED IN THE FIRST NETWORK, A REQUEST TO DISCOVER THE SOURCE NODE ASSOCIATED WITH THE MULTICAST GROUP OF DESTINATION NODES

508 SEND, FROM THE FIRST BORDER NODE AND TO THE SDN CONTROLLER, A ROUTE CONFIGURATION MESSAGE INCLUDING THE ADDRESS OF THE SOURCE NODE, THE GROUP ADDRESS, AND THE NETWORK CAPABILITY INFORMATION

FIG. 5

AUTOMATIC CONFIGURATION AND CONNECTION OF HETEROGENEOUS BANDWIDTH MANAGED MULTICAST FABRICS

CROSS REFERENCE TO RELATED APPLICATIONS

This application is a continuation of, and claims priority to U.S. application Ser. No. 16/743,752, filed Jan. 15, 2020, incorporated herein by reference.

TECHNICAL FIELD

The present disclosure relates generally to communicating local sources and network capability information to external networks to automatically configure and connect multicast networks managed by separate network controllers.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. Users may be allocated portions of computing resources across a number of networks using virtualization technology. The virtualized portions, or virtualized networks, of the computing networks may be utilized to allow a host (or "source node") to transmit data to a single host (or "destination node"), to all hosts, or to a subset of all hosts as a group transmission, also referred to as a multicast group transmission. For example, a corporation can utilize the virtualized network of computing resources to host a video conference, where data is broadcast from a source to recipients of a respective multicast group.

To support a multicast data transmission using cloud computing, a network controller may be utilized to automate configuration, connection, and operations of the computing resources across physical servers in a cloud computing network. To effectively route the data transmission from a source node to various destination nodes of a group, the network controller may track what resources have been placed on what physical servers in order to determine a topology of a network and route data efficiently. For example, a controller may determine that a new destination node has been disposed in the network and may maintain an address and/or operating attributes associated with the destination node. The controller may then identify a multicast group the destination node desires to join. The controller may then configure a route to transmit the data from the source node to the destination node. However, transmission of data from a source node, in a first network where the controller is disposed, to a destination node, disposed in a second network having a separate controller, may lead to difficulties when broadcasting a multicast data transmission to a group of destination nodes disposed across the multiple networks.

To effectively manage a multicast group of destination nodes across multiple networks, the controller of a first network having a source node must be aware of all of the destination nodes in order to configure a path for the data transmission. When a destination node is disposed in a second network that is separate from the first network, the controller of the first network has no knowledge of the destination node disposed in the second network. Additionally, the controller of the second network has no knowledge of the source node disposed in the first network. While utilizing a network controller to manage a multicast group of destination nodes and configure a data transmission route from a source node to the destination nodes is effective in a single network for various reasons, configuring a data transmission route from a source node to destination nodes in the same multicast group but located in different networks suffers from various limitations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for a Software-Defined-Networking controller in a first cloud computing network to advertise a multicast group source node and various network capability information to a second cloud computing network.

FIG. 5 illustrates a flow diagram of an example method for network border leaf switch in a first network communicatively coupled to a network border leaf switch in a second network to discover a multicast group source node disposed in the second network and various network capability information of the second network used to configure a route for a multicast data transmission.

DESCRIPTION OF EXAMPLE EMBODIMENTS

Overview

Figure 1:
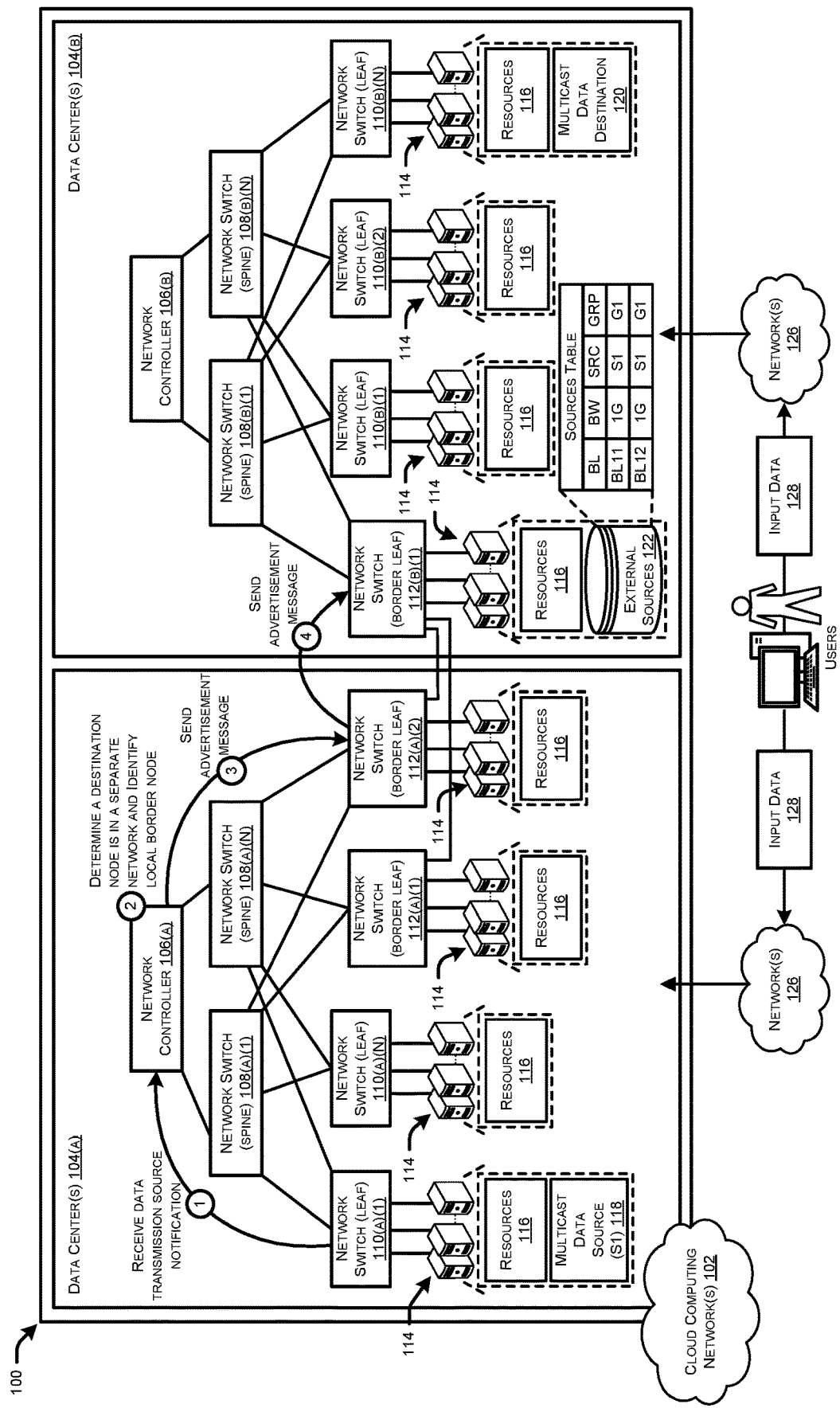
FIG. 1 illustrates a system-architecture diagram of an example flow for a network border leaf switch component communicating with another network border leaf switch component in a separate network to advertise a multicast group source node and various network capability information.

This disclosure describes a method of utilizing Software-Defined-Network (SDN) controllers and network border leaf switches of cloud computing networks to send, receive, and store in respective virtual memory, a table of external sources to configure a data transmission route for a multicast group. The method includes receiving, at an SDN controller in a first network, a request from a source node to coordinate a data transmission to a multicast group of destination nodes. The source node may be disposed in the first network. The method may further include determining, at the SDN controller, that at least one destination node in the multicast group of destination nodes is in a second network that is separate from the first network. The method may further include identifying, at the SDN controller, a first border node in the first network communicatively coupled to a second border node in the second network. The method may further include sending, from the SDN controller and to the first border node, an advertisement message including an indication of an address of the source node, a group address associated with the multicast group of destination nodes, and network capability information associated with the first network. The method may further include causing, by the SDN controller, the first border node to send the advertisement message to the second border node.

Additionally, or alternatively, the method includes receiving, at an SDN controller in a first network, a request from a destination node to join a multicast group of destination nodes receiving a data transmission. The destination node may be disposed in the first network. The method may further include sending, from the SDN controller and to a border node in the first network, a request to discover a source node associated with the multicast group of destination nodes. The method may further include receiving, at the SDN controller and from the border node, a discovery notification of the source node, disposed in a second network separate from the first network and associated with the multicast group of destination nodes. The discovery notification may include an indication of an address of the source node, a group address associated with the multicast group of destination nodes, and network capability information associated with the second network. The method may further include configuring, at the SDN controller, a route for the data transmission from the border node to the destination node based at least in part on the network capability information associated with the second network.

Additionally, or alternatively, the method includes receiving, at a first border node disposed in a first network and from a second border node disposed in a second network, an advertisement message. The advertisement message may include an indication of an address of a source node hosting a data transmission to a multicast group of destination nodes, a group address associated with the multicast group of destination nodes, and network capability information associated with the second network. The source node may be disposed in the second network. The method may further include storing, in a database associated with the first border node, the address of the source node, the group address, and the network capability information in association with the second border node. The method may further include receiving, at the first border node and from an SDN controller disposed in the first network, a request to discover the source node associated with the multicast group of destination nodes. The method may further include sending, from the first border node and to the SDN controller, a route configuration message including the address of the source node, the group address, and the network capability information.

Additionally, the techniques described herein may be performed by a system and/or device having non-transitory computer-readable media storing computer-executable instructions that, when executed by one or more processors, performs the method described above.

Example Embodiments

Generally, a Software-Defined-Networking (SDN) controller is designed to control a network of devices in one or more datacenters and utilize protocols to instruct network switches, running on physical server(s) within a cloud computing network, where to send data within the cloud computing network. The cloud computing network may include one or more spine network switches. A spine network switch may be running on a virtual machine hosted on a physical server within the cloud computing network and may be in communication with one or more leaf network switches. A leaf network switch may be running on another physical server within the cloud computing network The SDN controller may be utilized to send data using various techniques, for example, allowing a source node to send data to a subset of destination nodes as a group transmission, also referred to as a multicast group transmission. The SDN controller may track when resources have been placed on physical servers, forming a node in the network, in order to determine a topology of the network. The SDN controller may also detect where source nodes and destination nodes associated with a multicast group are within the network. The SDN controller may configure the network to set up a path for a flow of data with guaranteed bandwidth.

In an example, an SDN controller may discover a topology of a first network that the SDN controller is disposed in. In some examples, the SDN controller may discover where each network element of the first network is and how they are linked. Once the SDN controller has determined a topology of the first network, the SDN controller may discover which network elements (or nodes) are configured as a source for a multicast data transmission, and which nodes are configured as a destination for the multicast data transmission. When the SDN controller has discovered the topology of the first network and has discovered the source nodes and destination nodes of a multicast group, the SDN controller may configure a route for the data transmission from the source node to each of the destination nodes of the multicast group. Additionally, or alternatively, the SDN controller may configure the route to ensure the data is being transmitted through a route with a guaranteed bandwidth. However, in some examples the multicast group includes a destination node disposed in a second network. While the SDN controller of the first network has the ability to determine the topology of the first network in which it is disposed, the SDN controller does not know the topology of the second network, and thus is unaware of the destination node disposed in the second network. Additionally, an SDN controller disposed in the second network may be able to determine the topology of the second network but does not know the topology of the first network, and thus is unaware of the source node disposed in the first network. Accordingly, these limitations result in challenges presented when connecting source nodes and destination nodes for a multicast data transmission across multiple networks (or sites).

This disclosure describes techniques for network border leaf switches to maintain respective external sources databases such that source nodes in a first network can be connected to destination nodes in a second network for a multicast data transmission across the networks. Further, an SDN controller disposed in a network may communicate with a respective network border leaf switch to utilize network capability information stored in an external sources database associated with the border leaf switch to configure a route for a multicast data transmission across multiple networks. According to the techniques and mechanisms described herein, each network may have an SDN controller and one or more network border leaf switches that are communicatively coupled to one or more network border leaf switches of an additional, separate network.

The network border leaf switches may be communicatively coupled using various network protocols, such as, for example, a Border Gateway Protocol (BGP), a Secure Border Gateway Protocol, (S-BGP), a Secure Origin Border Gateway Protocol (soBGP), a Border Gateway Multicast Protocol (BGMP), a Multicast Source Discovery Protocol (MSDP), or an Inter-Domain Routing Protocol (IDRP), or anything of the like. Each network border leaf switch in a cloud computing network may maintain an external sources database containing information about the additional network border leaf switches to which they are communicatively coupled to. The external sources database may include an address of a network border leaf switch, a source node identifier, multicast group identifiers, and network capability information stored in association with a respective network border leaf switch. The network border leaf nodes may communicate this information utilizing an enhanced version of a Source Active A-D Route type, such that this route type includes one or more Multicast Capabilities fields in a Type Length Values (TLV) format. The Multicast Capabilities field may include information used to specify details of a network, such as bandwidth associated with the network, a Differentiated Services Code Point (DSCP) value, and/or a priority of the network.

Once a local source begins a multicast data transmission, a respective SDN controller disposed in the same network (the first network) may receive a notification indicating as much. At this point the SDN controller may be unaware of all of the destination nodes, such that the SDN controller does not know if the destination nodes are local or remote to the first network. The SDN controller may then send a local source discovery message to leaf nodes configured as border switches in the first network, such that they are communicatively coupled to additional border switches in another network (the second network). The network border leaf switches may then advertise the local source discovery message to all the external network border leaf switches to which they are coupled. Upon receiving a local source discovery message, the network border leaf switch may cache the information included in the discovery message in a respective external source database. Additionally, or alternatively, a local destination node may send, to an SDN controller disposed in the same network, a request to join a multicast group. In some examples, the request to join the multicast group may include an identifier of the multicast group. At this point, the SDN controller may be unaware of the source node, such that it does not know if the source node is local or remote to the network. The SDN controller may send a source discovery request to all the local network border leaf switches. A local network border leaf switch may receive this message and check in its respective external sources database to identify a source node associated with the multicast group. In some examples, a source node is not found, and the message is cached while the destination node remains waiting for a source to be discovered. In some examples, a source node is identified in the external sources database, and a source discovery notification is sent from the network border leaf switch to the SDN controller. The source discovery notification may include network capability information, such as bandwidth associated with the network and a priority associated with the multicast group and/or network. The SDN controller may then perform a bandwidth calculation and determine a path between this network border leaf switch and a switch where the local destination node is connected.

In an example cloud computing network, a first SDN controller, a first border leaf node, and a second border leaf node may be disposed in a first network. Additionally, or alternatively, a second SDN controller and a third border leaf node may be disposed in a second network separate from the first network. In some examples, the first border leaf node may be communicatively coupled to the third border leaf node. Additionally, or alternatively, the second border leaf node may be communicatively coupled to the third border leaf node. In some examples, the first SDN controller may receive a notification from a local switch in the first network where a source node is connected, the notification notifying the SDN controller of the presence of the source node as a sender for a multicast data transmission to a multicast group of destination nodes. In some examples, the SDN controller may determine that a destination node in the multicast group is remote from the network. Additionally, or alternatively, the SDN controller may identify the first and second border leaf nodes and send a local source discovery message to the first and second border leaf nodes. The local source discovery message may include, for example, an Internet Protocol (IP) address associated with the source node, an IP address and/or identifier associated with the multicast group, an indication of network bandwidth capabilities, and/or priorities associated with the network and/or multicast group. In some examples, the SDN controller may cause the first and second border leaf nodes to send the advertisement message to the third border leaf node. Additionally, or alternatively, the first border leaf node may send the advertisement message to the third border leaf node. Additionally, or alternatively, the second border leaf node may send the advertisement message to the third border leaf node. In some examples, the third border leaf node may maintain a local database including a table of external sources. In some examples, the third border leaf node may store the information included in the advertisement message in the external sources table in association with the border leaf node from which the message was received. For example, the third border leaf node may store the information included in the advertisement message received from the first border leaf node in association with the first border leaf node. Additionally, or alternatively, the third border leaf node may store the information included in the advertisement message received from the second border leaf node in association with the second border leaf node.

Additionally, or alternatively, the second SDN controller may receive a request from a local switch in the second network where a destination node is connected, the request requesting to join a multicast group as a destination node (i.e., configured to receive a data transmission). In some examples, the request may include an address of the multicast group (i.e., an IP address of the multicast group and/or an identifier associated with the multicast group). The SDN controller may send a source discovery request to the third border leaf node. Additionally, or alternatively, the SDN controller may send a source discovery request to all border leaf nodes disposed in the second network. The third border leaf node may query its respective local database for an external source associated with the multicast group. In some examples, an external source is not found, and the source discovery request is cached as long as the destination node remains active in the network. Additionally, or alternatively, an external source (the source node) is found in the external sources table. In some examples, the source node may be identified in multiple entries of the external sources table, such that there are multiple border leaf connections to reach the source node (i.e., the first border leaf node and the second border leaf node). In some examples, the third border node may identify the source node in association with the first border leaf node. Additionally, or alternatively, the third border leaf node may identify the source node in association with the second border leaf node. The third border leaf node may send a source discovery notification to the second SDN controller indicating an identifier (or address) of an external border leaf node, an identifier of the multicast group, an identifier of the source node, and/or network capability information associated with the first network. In some examples, when the third border leaf node discovers the source node in association with multiple border leaf nodes, the third border leaf node may send respective source discovery notifications. When the second SDN controller receives the source discovery notification(s), the SDN controller may compare the respective network capability information associated the first and second border leaf nodes to identify a path with available bandwidth and install routes in the second network accordingly to form a path from the third border leaf node to the local switch in the second network where the destination node is connected. Once the SDN controller forms the path, a Protocol Independent Multicast (PIM) join is sent to the first network, and the data transmission is pulled from the first network to the second network.

In some examples, in order to identify a path install routes capable of handling the multicast data transmission, the SDN controller may compare the respective network capability information associated with the first and second border leaf nodes to identify whether utilizing the first border leaf node is more favorable than utilizing the second border leaf node to form the path. For example, the SDN controller may utilize the network capability information to determine that the first border leaf node has more available bandwidth than the second border leaf node and may determine that installing a path utilizing the first border leaf node is more favorable than installing a path utilizing the second border leaf node. Additionally, or alternatively, the SDN controller may utilize the network capability information to determine that the first border leaf node has a higher priority in the network than the second border leaf node and may determine that installing a path utilize the first border leaf node is more favorable than installing a path utilizing the second border leaf node. Additionally, or alternatively, the SDN controller may utilize any of the information included with the network capability information to make a determination as to which border leaf node is more favorable than the border leaf nodes available to form the path.

As described herein, a computing resource (or a node) can generally include any type of computing resources, such as, for example, physical resource(s) associated with physical servers and/or physical links in a network. Additionally, or alternatively, the physical resource(s) may be apportioned or allocated to a virtual resource implemented by virtualization techniques, such as containers, virtual machines, virtual storage, and so forth, where the virtual resource(s) may utilize the allocated portions of the physical resources of the physical servers in the network. Further, although the techniques described as being implemented in data centers and/or a cloud computing network, the techniques are generally applicable for any network of devices managed by any entity where computing resource(s) are provisioned. In some instances, the techniques may be performed by a scheduler or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to broadcasting local sources and network capability information to external networks. For instance, the techniques described herein may provide network information of external sources to local SDN controllers and allow for a multicast data transmission across multiple cloud computing networks that are separate from one another. By maintaining a database of external sources and various network capability information at respective local border leaf nodes, the SDN controller may configure a path for a flow of data with a guaranteed bandwidth across multiple networks that are separate from one another, which was not previously possible.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example flow for broadcasting local source discovery messages indicating a source node address and network capability information within a cloud computing network 102. The cloud computing network 102 may comprise one or more data centers 104 that include various networking components, such as, a Software-Defined-Networking (SDN) controller 106, spine network switches 108, leaf network switches 110, which might be referred to as "leaf nodes," border leaf network switches 112, which might be referred to as "border leaf nodes," and physical servers 114. In some examples, the data center(s) 104 may be located across geographic areas, and the cloud computing network 102 may be a distributed network through which users (often customers) may interact via user devices to manage or otherwise interact with service provided by the cloud computing network 102.

The cloud computing network 102 may provide on-demand availability of computing system resources of physical server(s) 114, such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources of physical server(s) 114 in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services.

In some examples, physical server(s) 114 may host one or more virtual machines. Each virtual machine may be configured to execute one of various operations and act as one or more virtual components for the cloud computing network 102, such as, for example, resources 116. In some examples, the physical server(s) 114 may host any number of virtual machines. In some examples, physical server(s) 114 in the cloud computing network 102 may host a multicast data source 118 node. Additionally, or alternatively, physical server(s) 114 in the cloud computing network may host a multicast data destination 120 node. Additionally, or alternatively, physical server(s) 114 in the cloud computing network may host an external sources 122 database.

In some examples, a virtual machine may be configured to execute one of various operations and act as a network border leaf switch 112. A network border leaf switch 112 may be communicatively coupled to one or more network border leaf switches 112 and configured to forward communications between cloud computing network(s) 102 and/or data center(s) 104. For example, network border leaf switch 112(a)(1) may be configured to route communications between data center 104(a) and data center 104(b) within the cloud computing network by means of communicating with network border leaf switch 112(b)(1). Additionally, or alternatively, network border leaf switch 112(a)(2) may be configured to route communications between data center 104(a) and data center 104(b) within the cloud computing network by means of communicating with network border leaf switch 112(b)(1). Additionally, or alternatively, a virtual machine executing a network border leaf switch 112(b)(1) may include an allocated virtual memory configured as an external sources database 122 attached to the respective network border leaf switch 112(b)(1). The external sources database 122 may be configured to store information about the additional network border leaf switches 112(a)(1), 112(a)(2) that are communicatively coupled to the network border leaf switch 112(b)(1), and remote from. Additionally, or alternatively, the external sources database 122 may include an address of a network border leaf switch 112, a multicast data source 118 identifier, multicast group identifiers, and/or network capability information stored in association with a respective border leaf switch 112.

Generally, the number of resources 116 may scale based on a number of users 124 interacting with the cloud computing network. The users 124 may comprise one or more of individual users, groups of users, organizations, businesses, or other entities that interact with the cloud computing network 102 via respective user devices. The user devices may be any type of computing device capable of connecting to the cloud computing network 102 via a suitable data communications network 126 such as, but not limited to, a laptop or desktop computer, a tablet computing device, a server computer, a television, or a mobile telephone. Administrative users employed by the operator of the cloud computing network 102, such as administrators managing the operation of the cloud computing network 102, might also connect with, manage, and utilize resources provided by the service provider network 102 in a similar fashion.

The users 124 may provide input data 128 via the network(s) 126 to interact with the service that is supported by the resources 116 running on the servers 114. For example, the users 124 may submit requests to process data, retrieve data, store data, and so forth such that virtual machines hosting the resources 116 are spun up or spun down to process the requests based on demand.

An SDN controller 106(b) disposed in a network may communicate with a respective border leaf switch 108(b)(1) to utilize network capability information store in an external sources database 122 associated with the border leaf switch 108(b)(1) to configure a route for a multicast data transmission across multiple networks, data centers 104, and/or sites. Each SDN controller 106 may have one or more network border leaf switches 112 that are communicatively coupled to one or more border leaf switches 112 of an additional, separate network. The network border leaf switches 112 may be communicatively coupled using various network protocols, such as, for example, a Border Gateway Protocol (BGP), a Secure Border Gateway Protocol, (S-BGP), a Secure Origin Border Gateway Protocol (soBGP), a Border Gateway Multicast Protocol (BGMP), a Multicast Source Discovery Protocol (MSDP), or an Inter-Domain Routing Protocol (IDRP), or anything of the like. Each network border leaf switch 112 in a cloud computing network 102 may maintain an external sources database 122 containing information about the additional network border leaf switches 112 to which they are communicatively coupled to. The external sources database 122 may include an address of a network border leaf switch 122, a multicast data source 118 identifier, multicast group identifiers, and network capability information stored in association with a respective network border leaf switch 112. The network border leaf switches 112 may communicate this information utilizing an enhanced version of a Source Active A-D Route type, such that this route type includes one or more Multicast Capabilities fields in a Type Length Values (TLV) format. The Multicast Capabilities field may include information used to specify details of a cloud computing network 102, such as bandwidth associated with the network, a Differentiated Services Code Point (DSCP) value, and/or a priority of the network.

When a local multicast data source 118 begins a multicast data transmission, a respective SDN controller 106(a), disposed in the same network (associated with a data center 104(a)), may receive a notification a notification indicating as much. At this point the SDN controller 106(a) may be unaware of the destination nodes associated with a multicast group (G1), such that the SDN controller does not know if the destination nodes are local or remote to its respective network. For example, multicast data destination node 120 is remote from SDN controller 106(a), and thus, SDN controller 106(a) is unaware that multicast data destination node 120 is associated with the multicast group (G1). SDN controller 106(a) may then send a local source discovery message to local leaf switches configured as border leaf switches 112(a)(1), 112(a)(2) (also referred to as border leaf nodes) in the same network. The leaf nodes may be configured as border leaf nodes 112(a)(1), 112(a)(2) such that they are communicatively coupled to additional border leaf node(s) 112(b)(1) in a separate network. The border leaf nodes 112(a)(1), 112(a)(2) may then advertise the local source discovery message to all the external border leaf nodes 112(b)(1) to which they are coupled. Upon receiving a local source discovery request message, the border leaf node 112(b)(1) receiving the discovery message may cache the information included in the discovery message in a respective external sources database 122. In some examples, the local source discovery message may include an address and/or an identifier of the multicast data source 118, an address and/or an identifier of the multicast group (G1), and/or network compatibility information associated with the network in which the multicast data source 118 is disposed.

Additionally, or alternatively, a local multicast data destination node 120 may send, to an SDN controller 106(b) disposed in the same network, a request to join a multicast group (G1). In some examples, the request to join the multicast group (G1) may include an identifier of the multicast group. At this point, the SDN controller 106(b) may be unaware of the multicast data source node 118, such that it does not know if the multicast data source node 118 is local or remote to the network that the SDN controller 106(b) is disposed in. For example, multicast data source node 118 is remote from SDN controller 106(b), and thus, SDN controller 106(b) is unaware that multicast data source node 118 is associated with the multicast group (G1). The SDN controller 106(b) may send a source discovery request to all of the local border leaf nodes 112(b)(1). The local border leaf node 112(b)(1) may receive this message and check in its respective external sources database 122 to identify a multicast data source node (S1) 118 associated with the multicast group (G1). In some examples, a multicast data source node 118 is not found, and the message is cached while the multicast data destination node 120 remains waiting for a multicast data source node 118 to be discovered. In some examples, a multicast data source node 118 is identified in the external sources database 122, and a source discovery notification is sent from the border leaf node 112(b)(1) to the SDN controller 106(b). The source discovery notification may include network capability information, such as bandwidth associated with the network and a priority associated with the multicast group (G1) and/or network. The SDN controller may then perform a bandwidth calculation and determine a path between this border leaf switch 112(b)(1) and a switch 110(b)(N) where the local destination node is connected.

At "1," a local multicast data source (S1) 118 may begin a multicast data transmission. The SDN controller 106(a) in the same network may receive a notification from a local leaf switch (or node) 110(a)(1) where the multicast data source 118 is connected. In some examples, the notification may indicate that the local multicast data source 118 has started a multicast data transmission. Additionally, or alternatively, the notification may indicate that the local multicast data source 118 has begun sending traffic. Additionally, or alternatively, the notification may indicate a presence of the multicast data source node 118 as a sender for a multicast data transmission to a multicast group (G1) of destination nodes.

At "2," the SDN controller 106(a) may then identify all of the local network leaf nodes that are configured as border leaf nodes 112(a)(1), 112(a)(2), such that they are communicatively coupled to at least one remote border leaf node 112(b)(1) disposed in a separate network. Additionally, or alternatively, the SDN controller 106(a) may determine that a destination node associated with the multicast group (G1) is remote from the network that the SDN controller 106(a) is disposed in.

At "3," the SDN controller may send a local source discovery message to the local border leaf nodes 112(a)(1), 112(a)(2) that were identified in step "2." In some examples, the local source discovery message may include, for example, an Internet Protocol (IP) address associated with the multicast data source node 118, an IP address and/or identifier associated with the multicast group (G1), an indication of network bandwidth capabilities, and/or priorities associated with the network and/or multicast group.

At "4," the SDN controller 106(a) may cause the border leaf nodes 112(a)(1), 112(a)(2) to send respective local source discovery messages to the attached border leaf node 112(b)(1) disposed in the separate network. In some examples, after the border leaf node 112(b)(1) receives the local source discover message(s) from the communicatively coupled border leaf node(s) 112(a)(1), 112(a)(2), the border leaf node 112(b)(1) may store the information included in the local source discovery message in the external sources database 122. In some examples, the border leaf node 112(b)(1) may store the information in association with the respective border leaf node(s) 112(a)(1), 112(a)(2) from which the message was received.

Figure 2:
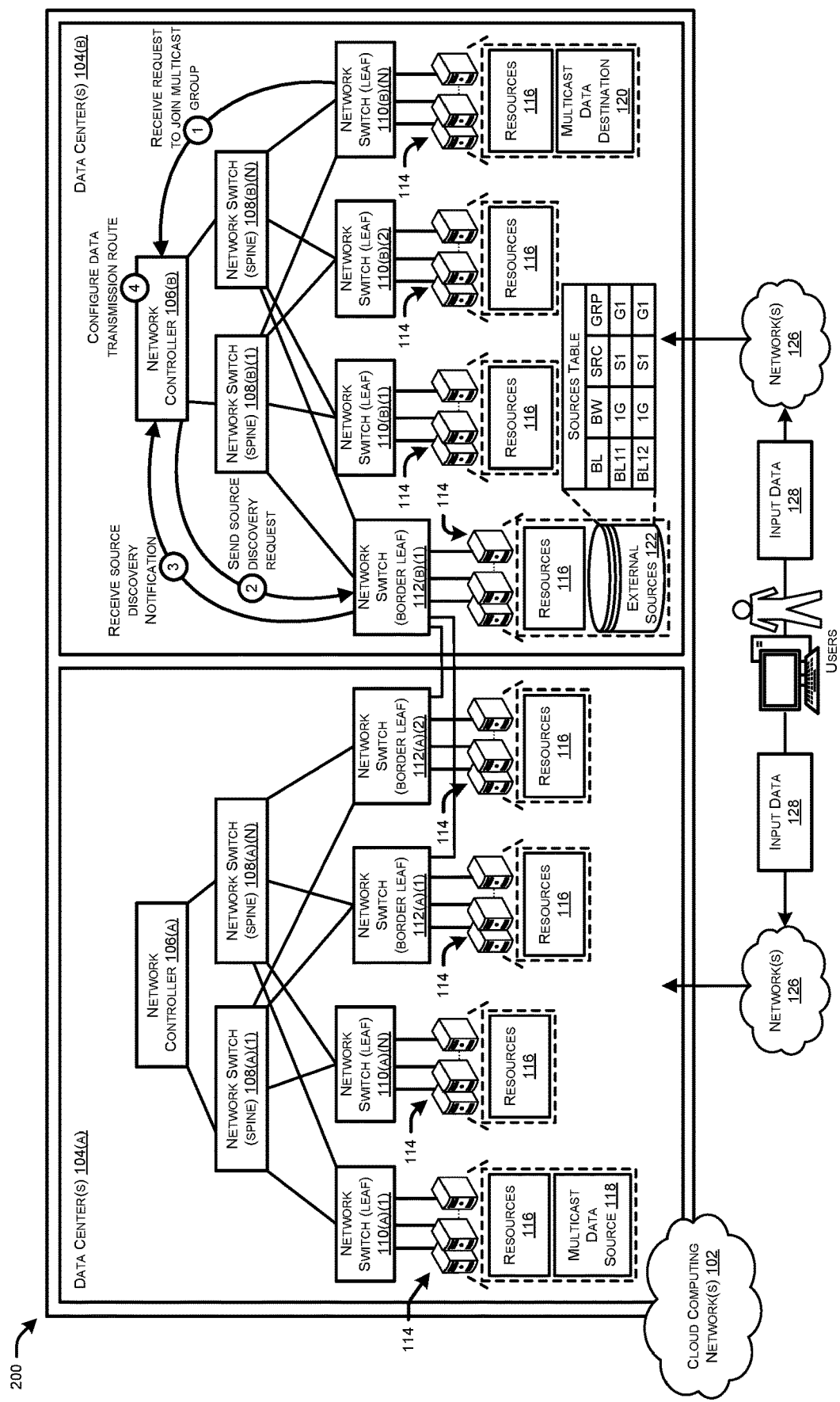
FIG. 2 illustrates a system-architecture diagram of an example flow for a network border leaf switch component communicating with another network border leaf switch component in a separate network to discover a multicast group source node and various network capability information to configure a route for a multicast data transmission.

In some examples, the example flow may continue from step "4" of FIG. 1 to step "1" of FIG. 2. Additionally, or alternatively, the example flow may begin from step "1" of FIG. 2 and continue from step "4" of FIG. 2 to step "1" of FIG. 1.

FIG. 2 illustrates a system-architecture diagram 200 of an example flow for receiving a request for a multicast data destination node 120 to discover a multicast data source node (S1) 118 associated with a multicast group (G1) and various network capability information to configure a route for a multicast data transmission.

A local multicast data destination node 120 may send, to an SDN controller 106(b) disposed in the same network, a request to join a multicast group (G1). In some examples, the request to join the multicast group (G1) may include an identifier of the multicast group. At this point, the SDN controller 106(b) may be unaware of the multicast data source node 118, such that it does not know if the multicast data source node 118 is local or remote to the network that the SDN controller 106(b) is disposed in. For example, multicast data source node 118 is remote from SDN controller 106(b), and thus, SDN controller 106(b) is unaware that multicast data source node 118 is associated with the multicast group (G1). The SDN controller 106(b) may send a source discovery request to all of the local border leaf nodes 112(b)(1). The local border leaf node 112(b)(1) may receive this message and check in its respective external sources database 122 to identify a multicast data source node (S1) 118 associated with the multicast group (G1). In some examples, a multicast data source node 118 is not found, and the message is cached while the multicast data destination node 120 remains waiting for a multicast data source node 118 to be discovered. In some examples, a multicast data source node 118 is identified in the external sources database 122, and a source discovery notification is sent from the border leaf node 112(b)(1) to the SDN controller 106(b). The source discovery notification may include network capability information, such as bandwidth associated with the network and a priority associated with the multicast group (G1) and/or network. The SDN controller 106(b) may then perform a bandwidth calculation and determine a path between this border leaf switch 112(b)(1) and a switch 110(b)(N) where the local multicast data destination node 120 is connected.

In some examples, the example flow below may continue from step "4" of FIG. 1 to step "1" of FIG. 2. Additionally, or alternatively, the example flow may begin from step "1" of FIG. 2 and continue from step "4" of FIG. 2 to step "1" of FIG. 1.

At "1," a local multicast data destination node 120 may send a request to join a multicast group (G1) to an SDN controller 106(b) disposed in the same network. In some examples, the request may include an IP address and/or an identifier of the multicast group (G1). The SDN controller 106(b) may receive the request to join the multicast group (G1) from the multicast data destination node 120. At this point, the SDN controller 106(b) may be unaware of a multicast data source node 118, such that the multicast data source node 118 is remote from the SDN controller 106(b).

At "2," the SDN controller 106(b) may then identify all of the local network leaf nodes that are configured as local border leaf node(s) 112(b)(1), such that they are communicatively coupled to at least one remote border leaf node 112(a)(1), 112(a)(2) disposed in a separate network. Additionally, or alternatively, the SDN controller 106(b) may determine that the multicast data source node 118 associated with the multicast group (G1) is remote from the network that the SDN controller 106(b) is disposed in. The SDN controller 106(b) may send a source discovery request to the local border leaf node(s) 112(b)(1). In some examples, the source discovery request may include, for example, an IP address and/or an identifier associated with the multicast group (G1).

At "3," the local border leaf node 112(b)(1) may check in the attached external sources database 122 to identify a multicast data source node (S1) 118 associated with the multicast group (G1). In some examples, a multicast data source node 118 is not found, and the message is cached while the multicast data destination node 120 remains waiting for a multicast data source node 118 to be discovered. Additionally, or alternatively, a multicast data source node 118 associated with the multicast group (G1) is identified in the external sources database 122, and a source discovery notification is sent from the border leaf node 112(b)(1) to the SDN controller 106(b). In some examples, the source discovery notification may include network capability information, such as bandwidth associated with the network and a priority associated with the multicast group (G1) and/or network.

At "4," the SDN controller 106(b) may then perform a bandwidth calculation and determine a path between this border leaf switch 112(b)(1) and a switch 110(b)(N) where the local destination node is connected and configured a route for the multicast data transmission. In some examples, the SDN controller 106(b) may configure the route to ensure the data is being transmitted through a route with a guaranteed bandwidth required for the data transmission.

Figure 4:
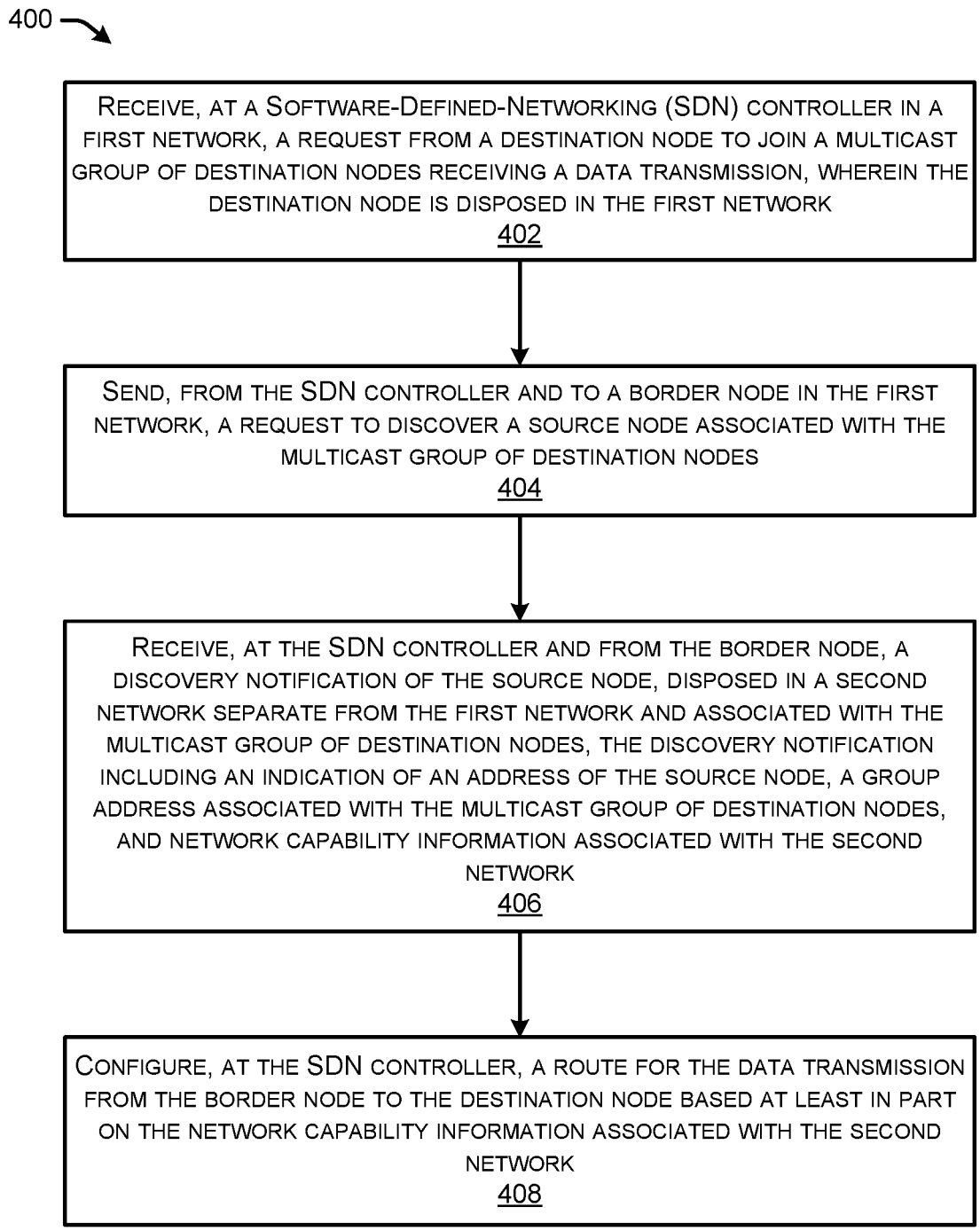
FIG. 4 illustrates a flow diagram of an example method for a Software-Defined-Networking controller in a first cloud computing network to discover a multicast group source node disposed in a second network and various network capability information of the second network to configure a route for a multicast data transmission.

FIGS. 3-5 illustrate flow diagrams of example methods 300, 400, and 500 and that illustrate aspects of the functions performed at least partly by the cloud computing network 102 as described in FIGS. 1 and 2. The logical operations described herein with respect to FIGS. 3-5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3-5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a Software-Defined-Networking (SDN) controller 106(a) in a first cloud computing network to advertise a multicast data source node 118 and various network capability information associated with the first network to a second cloud computing network, utilizing one or more border leaf nodes 112(a)(1), 112(a)(2) disposed in the first network and communicatively coupled to one or more border leaf nodes 112(b)(1) disposed in the second network. In some examples, the method 300 may be performed by a system comprising one or more processors and one or more non-transitory computer-readable media storing computer-executable instructions that, when executed by the one or more processors, cause the one or more processors to perform the method 300.

At 302, a Software-Defined-Networking (SDN) controller 106(a) in a first cloud computing network may receive a request from a multicast data source node 118 to coordinate a data transmission to a multicast group (G1) of destination nodes. In some examples, the source node may be disposed in the first network. Additionally, or alternatively, the SDN controller may receive a notification from a network switch 110(a)(1) where the multicast data source node 118 is connected, indicating that the multicast data source node 118 has started sending traffic to the multicast group (G1).

At 304, the SDN controller 106(a) may determine that at least one multicast data destination node 120 in the multicast group (G1) of destination nodes is in a second network that is separate from the first network.

At 306, the SDN controller 106(a) may identify a first border node 112(a)(1) in the first network and communicatively coupled to a second border node 112(b)(1) in the second network. Additionally, or alternatively, the SDN controller 106(a) may identify one or more border nodes 112(a) in the first network and communicatively coupled to one or more second border nodes 112(b) in the second network.

At 308, the SDN controller 106(a) may send, to the first border node 112(a)(1), an advertisement message. In some examples, the advertisement message may include an indication of an address and/or an identifier of the multicast data source node 118, an address and/or an identifier associated with the multicast group of destination nodes (G1), and/or network capability information associated with the first network. Additionally, or alternatively the SDN controller 106(a) may send the advertisement message to one or more border nodes 112(a) in the first network.

At 310, the SDN controller may cause the first border node 112(a)(1) to send the advertisement message to the second border node 112(b)(1). Additionally, or alternatively, the SDN controller 106(a) may cause one or more border nodes 112(a) to send the advertisement message to one or more second border nodes 112(b) disposed in the second network.

FIG. 4 illustrates a flow diagram of an example method 400 for a Software-Defined-Networking (SDN) controller 106(b) in a first cloud computing network to discover a multicast data source node 118 disposed in a second, remote network, and various network capability information of the second network to configure a route for a multicast data transmission from a border leaf node 112(b)(1) to a network switch 110(b)(N) connected.

At 402, a Software-Defined-Networking (SDN) controller 106(b) in a first cloud computing network may receive a request from multicast data destination node 120 to join a multicast group of destination nodes (G1) receiving a data transmission. In some examples, the multicast data destination node 120 is disposed in the first network.

At 404, the SDN controller 106(*b*) may send, to a border node 112(*b*)(1) in the first network, a request to discover a multicast data source node 118 associated with the multicast group of destination nodes (G1).

At 406, the SDN controller 106(*b*) may receive, from the border node 112(*b*)(1), a discovery notification of the multicast data source node 118. In some examples, the multicast data source node 118 may be disposed in a second network separate from the first network and associated with the multicast group of destination nodes (G1). In some examples, the discovery notification may include an indication of an address and/or an identifier of the multicast data source node 118, a group address and/or an identifier associated with the multicast group of destination nodes (G1), and/or network capability information associated with the second network.

At 408, the SDN controller 106(*b*) may configure a route for the data transmission from the border node 112(*b*)(1) to the multicast data destination node 120. In some examples, the SDN controller 106(*b*) may configured the route based at least in part on the network capability information associated with the second network. In some examples, the network capability information may include information used to specify details of a network, such as bandwidth associated with the network, a Differentiated Services Code Point (DSCP) value, and/or a priority of the network.

FIG. 5 illustrates a flow diagram of an example method 500 for a network border leaf node 112(*b*)(1) disposed in a first network and communicatively coupled to one or more network border leaf nodes 112(*a*)(1), 112(*a*)(2) disposed in a second, remote network, to discover a multicast data source node 118 disposed in the second network, and various network capability information associated with the second network and used to configure a route for a multicast data transmission from the border leaf switch 112(*b*)(1) to a switch 110(*b*)(N) where the local multicast data destination node 120 is connected.

At 502, a first border node 112(*b*)(1) disposed in a first network may receive, from a second border node 112(*a*)(1) disposed in a second network, an advertisement message. In some examples, the advertisement message may include an indication of an address and/or and identifier of a multicast data source 118 an address and/or an identifier of the multicast group (G1), and/or network compatibility information associated with the network in which the multicast data source 118 is disposed. In some examples, the source node is disposed in the second network.

At 504, the first border node 112(*b*)(1) may store, in an external sources database 122 associated with the first border node 112(*b*)(1), the address and/or identifier of the multicast data source 118, the address and/or identifier of the multicast group (G1), and/or the network capability information in association with the second border node 112(*a*)(1).

At 506, the first border node 112(*b*)(1) may receive, from a Software-Defined-Networking (SDN) controller 106(*b*) disposed in the first network, a request to discover the multicast data source 118 associated with the multicast group of destination nodes (G1). In some examples, the request may include an indication of the address and/or identifier of the multicast group (G1).

At 508, the first border node 112(*b*)(1) may send, to the SDN controller 106(*b*), a route configuration message. In some examples, the route configuration message may include the address and/or identifier of the multicast data source 118, the address and/or identifier of the multicast group (G1), and/or the network capability information.

Figure 6:
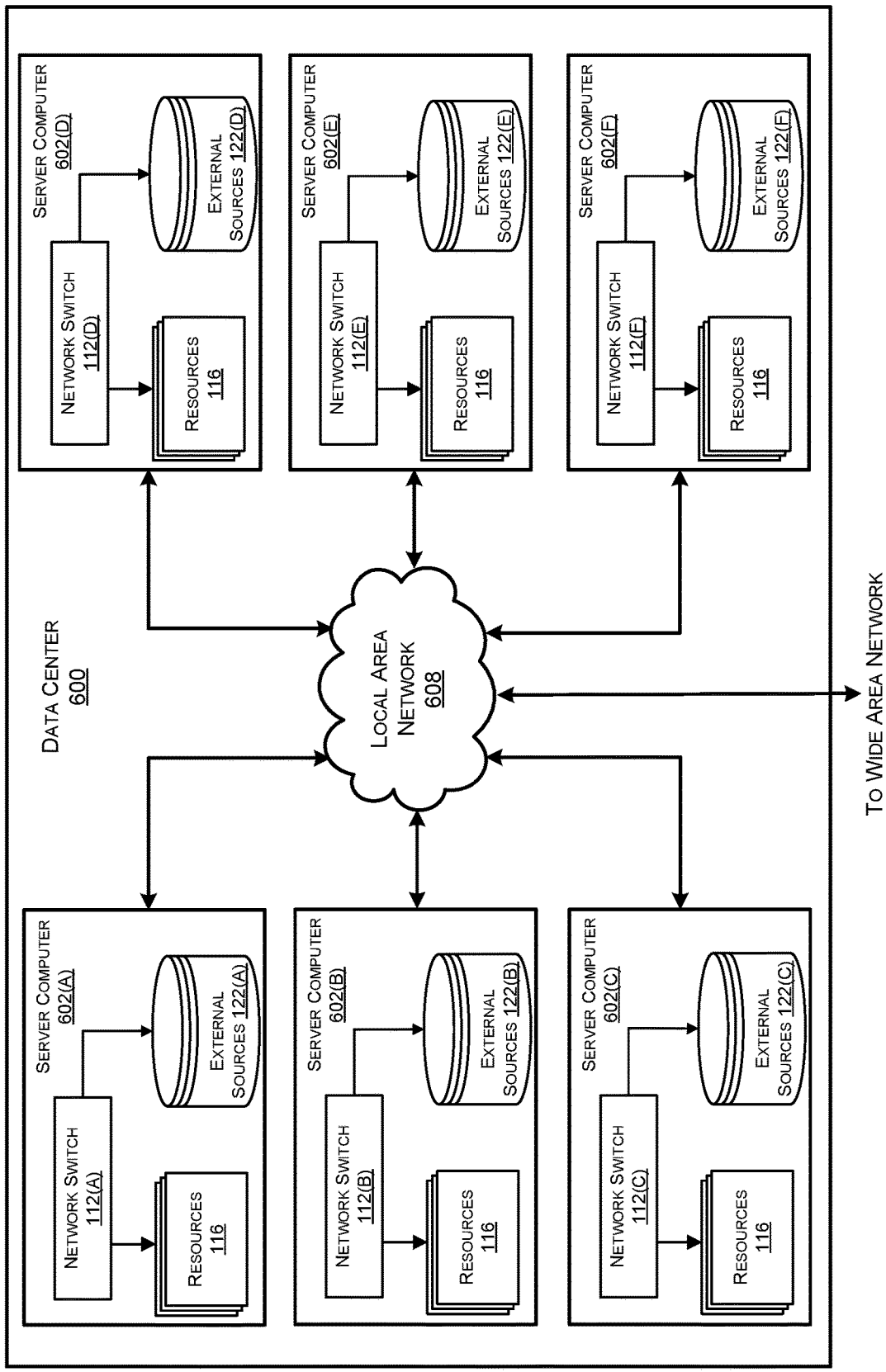
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the server computers 602 may include, or correspond to, the servers 114 described herein.

The server computers 602 can be standard tower, rack-mount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more resources 116 that support a service or application, such as, for example, a multicast data source 118, and/or multicast data destination 120, provisioned across a set or cluster of servers 602. The resources 116 on each server computer 602 may support a single application or service, or multiple applications or services (for one or more users).

In some instances, the cloud computing network 102 may provide computing resources, like application containers, VM instances, and storage, on a permanent or an as-needed basis. Among other types of functionality, the computing resources provided by the cloud computing network 102 may be utilized to implement the various services described above. The computing resources provided by the cloud computing network 102 can include various types of computing resources, such as data processing resources like application containers and VM instances, data storage resources, networking resources, data communication resources, network services, and the like.

Each type of computing resource provided by the cloud computing network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud computing network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 6.

Figure 7:
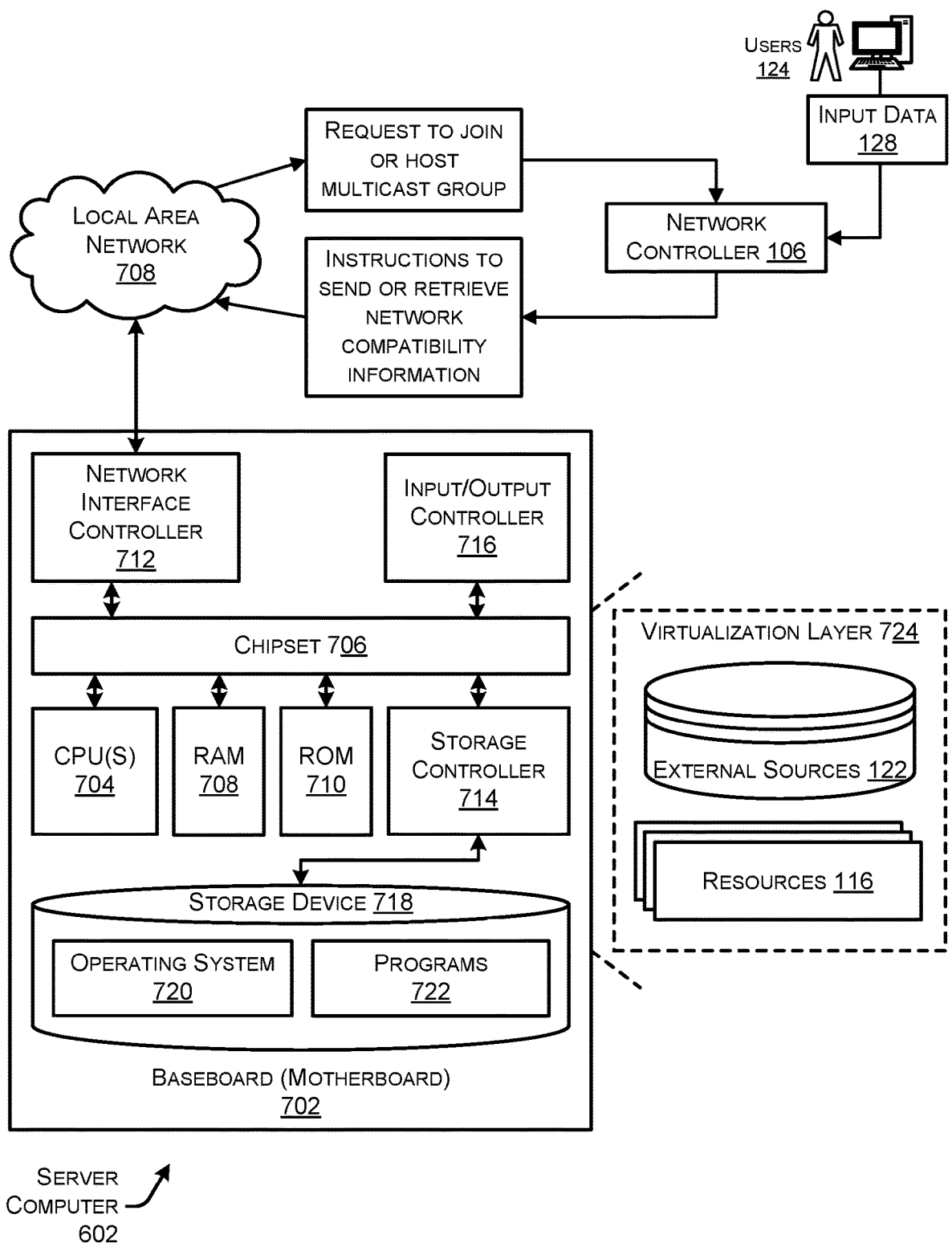
FIG. 7 is a computer architecture diagram showing an illustrative computer hardware architecture for implementing a server device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 602 may, in some examples, correspond to a physical server 114 described herein.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 702 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computer 602 to other computing devices over the network 608 (or 126). It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by the cloud computing network 102, and or any components included therein, may be supported by one or more devices similar to computer 602. Stated otherwise, some or all of the operations performed by the cloud computing network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

The server computer 602 may support a virtualization layer 724, such as one or more virtual resources 116 executing on the server computer 602, such as, for example, a multicast data source 118 and/or a multicast data destination 120. In some examples, the virtualization layer 724 may be supported by a hypervisor that provides one or more virtual machines running on the server computer 602 to perform functions described herein. The virtualization layer 724 may generally support a virtual resource that performs at least portions of the techniques described herein. The border leaf node 112 may send and receive various data and provide it to components. For instance, the border leaf node 112 may receive a local source discovery message containing data indicating an address and/or identifier of a multicast data source node 118, and store an association between the border leaf node 112 from which it was received and the multicast data source node 118 to later configure a route for a multicast data transmission to a multicast data destination node 120.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed by the one or more processors, cause the one or more processors to perform operations comprising:
receiving, at a first border node in a first network, a request from a source node to coordinate a data transmission to a multicast group of destination nodes, wherein the source node is disposed in the first network;
determining, at the first border node, that at least one destination node in the multicast group of destination nodes is disposed in a second network that is separate from the first network;
identifying, at the first border node, a second border node in the second network that is communicatively coupled to the first border node; and
sending, from the first border node and to the second border node, an advertisement message including an indication of an address of the source node, a group address associated with the multicast group of destination nodes, and network capability information associated with the first network.

2. The system of claim 1, wherein the first border node and the second border node are communicatively coupled by at least one of a Border Gateway Protocol (BGP), a Secure Border Gateway Protocol, (S-BGP), a Secure Origin Border Gateway Protocol (soBGP), a Border Gateway Multicast Protocol (BGMP), a Multicast Source Discovery Protocol (MSDP), or an Inter-Domain Routing Protocol (IDRP).

3. The system of claim 1, wherein the group address includes respective addresses of individual destination nodes included in the multicast group of destination nodes.

4. The system of claim 1, wherein the group address associated with the multicast group of destination nodes comprises at least one of an Internet Protocol (IP) address or a Media Access Control (MAC) address for individual destination nodes of the multicast group of destination nodes.

5. The system of claim 1, the operations further comprising:
   determining, at the first border node, that at least one destination node in the multicast group of destination nodes is disposed in a third network that is separate from the first network and the second network;
   identifying, at the first border node, a third border node in the first network communicatively coupled to a fourth border node in the third network;
   sending, from the first border node and to the third border node, the advertisement message; and
   causing, by the first border node, the third border node to send the advertisement message to the fourth border node.

6. The system of claim 1, wherein the network capability information comprises a bandwidth associated with the first network and a priority associated with the multicast group of destination nodes.

7. The system of claim 1, wherein the advertisement message is encoded in a Type-Length-Value (TLV) format.

8. A method comprising:
   receiving, at a border node in a network, a request from a destination node to join a multicast group of destination nodes receiving a data transmission, wherein the destination node is disposed in the network;
   determining, at the border node, a source node associated with the multicast group of destination nodes;
   identifying, at the border node, discovery data associated with the source node, disposed in the network and associated with the multicast group of destination nodes, the discovery data including an indication of an address of the source node, a group address associated with the multicast group of destination nodes, and network capability information associated with the network; and
   configuring, at the border node, a route for the data transmission from the border node to the destination node based at least in part on the network capability information associated with the network.

9. The method of claim 8, wherein the network capability information is encoded in a Type-Length-Value (TLV) format.

10. The method of claim 8, wherein the network capability information comprises a bandwidth associated with the network and a priority associated with the multicast group of destination nodes.

11. The method of claim 8, wherein the group address associated with the multicast group of destination nodes comprises at least one of an Internet Protocol (IP) address or a Media Access Control (MAC) address for individual destination nodes of the multicast group of destination nodes.

12. The method of claim 8, wherein the indication of the address of the source node, the group address associated with the multicast group of destination nodes, and the network capability information is stored in a database associated with the border node.

13. The method of claim 8, wherein the source node is a first source node, the discovery data is first discovery data, the network is a first network, and the network capability information is first network capability information, and the method further comprising:
   identifying, at the border node, second discovery data associated with a second source node, disposed in a second network separate from the first network and associated with the multicast group of destination nodes, the second discovery data including an indication of an address of the second source node, a group address associated with the multicast group of destination nodes, and second network capability information associated with the second network;
   determining, at the border node, that the first network capability information is more favorable than the second network capability information; and
   wherein configuring the route for the data transmission from the border node to the destination node is based at least in part on the determining that the first network capability information is more favorable than the second network capability information.

14. The method of claim 13, wherein the border node is a first border node, and the method further comprising:
   determining, at the border node, that the second network capability information is more favorable than the second network capability information; and
   configuring the route from the first border node to a second border node disposed in the second network.

15. A method comprising:
   receiving, at a first border node disposed in a first network and from a second border node disposed in a second network, an advertisement message including an indication of an address of a source node hosting a data transmission to a multicast group of destination nodes, a group address associated with the multicast group of destination nodes, and network capability information associated with the second network, wherein the source node is disposed in the second network;
   storing, in a database associated with the first border node, the address of the source node, the group address, and the network capability information in associated with the second border node;
   receiving, at the first border node and from the first network, a request to discover the source node associated with the multicast group of destination nodes; and
   identifying, in the database associated with the first border node, route configuration information for configuring a route to coordinate the data transmission to the multicast group of destination nodes, the route configuration information including the address of the source node, the group address, and the network capability information.

16. The method of claim 15, wherein the advertisement message is encoded in a Type-Length-Value (TLV) format.

17. The method of claim 15, wherein the network capability information comprises a bandwidth associated with the second network and a priority associated with the multicast group of destination nodes.

18. The method of claim 15, wherein the group address associated with the multicast group of destination nodes comprises at least one of an Internet Protocol (IP) address or a Media Access Control (MAC) address for individual destination nodes of the multicast group of destination nodes.

19. The method of claim 15, wherein the first border node and the second border node are communicatively coupled by at least one of a Border Gateway Protocol (BGP), a Secure Border Gateway Protocol, (S-BGP), a Secure Origin Border Gateway Protocol (soBGP), a Border Gateway Multicast Protocol (BGMP), a Multicast Source Discovery Protocol (MSDP), or an Inter-Domain Routing Protocol (IDRP).

20. The method of claim 15, wherein:
   the source node is a first source node;
   the route is a first route;
   the advertisement message is a first advertisement message;

the network capability information is first network capability information; and the route configuration information is a first route configuration information; and the method further comprising:

receiving, at the first border node and from a third border node disposed in a third network, a second advertisement message including an indication of an address of a second source node hosting the data transmission to the multicast group of destination nodes, the group address associated with the multicast group of destination nodes, and second network capability information associated with the third network, wherein the second source node is disposed in the third network;

storing, in the database associated with the first border node, the address of the second source node, the group address, and the second network capability information in association with the third border node; and identifying, in the database associated with the first border node, second route configuration information for configuring a second route to coordinate the data transmission to the multicast group of destination nodes, the route configuration information including the address of the second source node, the group address, and the second network capability information.

* * * * *